United States Patent [19]
Roling et al.

[11] Patent Number: 4,665,138
[45] Date of Patent: May 12, 1987

[54] PROCESS FOR POLYMERIZING A MONOMER CHARGE

[75] Inventors: Paul V. Roling, Spring, Tex.; Richard L. Veazey, East Windsor, N.J.; David E. Aylward, Hazelton, Pa.

[73] Assignee: Cities Service Oil & Gas Corp, Tulsa, Okla.

[21] Appl. No.: 714,433

[22] Filed: Mar. 21, 1985

Related U.S. Application Data

[60] Continuation-in-part of Ser. No. 566,542, Dec. 29, 1983, abandoned, which is a division of Ser. No. 444,288, Nov. 24, 1982, Pat. No. 4,434,242.

[51] Int. Cl.$^4$ .......................... C08F 2/34; C08F 10/02
[52] U.S. Cl. ........................................ 526/86; 526/87; 526/88; 526/124; 526/129; 526/142; 526/144; 526/901
[58] Field of Search .................. 526/87, 86, 88, 97, 526/121, 124, 129, 142

[56] References Cited

U.S. PATENT DOCUMENTS

| | | | |
|---|---|---|---|
| 2,965,626 | 12/1960 | Pillar et al. | 526/142 |
| 3,163,611 | 12/1964 | Andersen et al. | 526/142 |
| 3,202,645 | 8/1965 | Yancey | 526/97 |
| 3,219,652 | 11/1965 | Hill et al. | 526/142 |
| 3,718,636 | 2/1973 | Stevens et al. | 526/97 |
| 3,787,384 | 1/1974 | Stevens et al. | 526/129 |
| 3,790,550 | 2/1974 | Miller | 526/901 |
| 3,925,338 | 12/1975 | Ort | 526/97 |
| 4,232,140 | 11/1980 | Ort | 526/124 |
| 4,383,095 | 5/1983 | Goeke et al. | 526/88 |
| 4,434,242 | 2/1984 | Roling et al. | 526/129 |

*Primary Examiner*—Edward J. Smith
*Attorney, Agent, or Firm*—John Wade Carpenter

[57] ABSTRACT

Process of polymerizing a monomer charge including ethylene by (1) drying an inorganic oxide having surface hydroxyl groups, e.g. silica, alumina, magnesia, etc. to remove adsorbed water (2) reacting the surface hydroxyl groups with at least a stoichiometric amount of an organometallic compound having at least one alkyl group attached to a Group III metal, e.g., a trialkylaluminum, (3) reacting the thus-treated inorganic oxide with a vanadium halide, such as (a) $VOCl_3$, $VOBr_3$, and/or mono-, di-, and/or trihydrocarbyloxy derivatives thereof and/or (b) $VCl_4$, $VBr_4$, and/or mono-, di-, tri-, and/or tetrahydrocarbyloxy derivatives thereof, (4) reacting that reaction product with at least about 0.1 mol, per mol of organometallic compound, of an ether-alcohol corresponding to the formula $R''[OCHR'(CH_2)_nCHR]_mOH$, wherein R and R' are independently selected from the group consisting of hydrogen and alkyl groups containing 1 to 18 carbon atoms, R'' is a hydrocarbyl group, n has a value of 0 to 16, and m has a value of at least 1, (5) feeding the product into a gas-phase reaction zone, (6) feeding a trialkylaluminum into the gas-phase reaction zone in order to form a bed comprising the product and the trialkylaluminum, (7) fluidizing the bed with a gas mixture of ethylene, hydrogen and chloroform, (8) removing polymerized ethylene particles from the reaction zone, and (9) recycling unreacted gas mixture from the top of the reaction zone to the bottom of the reaction zone.

27 Claims, No Drawings

PROCESS FOR POLYMERIZING A MONOMER CHARGE

This is a continuation-in-part application of our co-pending application filed on Dec. 29, 1983 and having Ser. No. 566,542, now abandoned. Our co-pending application was a divisional application of an application which had Ser. No. 444,288 and a filing date Nov. 24, 1982 and now U.S. Pat. No. 4,434,242.

BACKGROUND OF THE INVENTION

1. Field of the Invention

This invention relates to the polymerization of olefins. More particularly, this invention relates to a process having catalyst compositions which are useful for polymerizing one or more monomers comprising ethylene to polymers having a narrow molelcular weight distribution and a good balance of physical properties.

2. Description of the Prior Art

It is known that catalysts of the type variously described as coordination, Ziegler, Zieger-type, or Ziegler-Natta catalysts are useful for the polymerization of olefins under moderate conditions of temperature and pressure. It is also known that the properties of the polymers obtainable by the use of such catalysts, as well as the relative economies of the processes used to prepare the polymers, vary with several factors, including the choice of the particular monomers, catalysts components, polymerization adjuvants, and other polymerization conditions employed.

During the years since Ziegler catalysts were first publicly disclosed, there has been a considerable amount of research conducted on the use of such catalysts; and numerous publications have resulted from that research. These publications have added much to the knowledge of how to make various types of olefin polymers by various types of processes. However, as is apparent from the amount of research on Ziegler catalysts that is still being conducted throughout the world, as well as the number of patents that are still being issued to the inventors working in the field of Ziegler catalysts, the means of attaining certain results when polymerizing olefins with Ziegler catalysts are still frequently unpredictable. The fact that this situation exists is sometimes due to the need to obtain a previously-unattainable combination of results; occasionally due to difficulties in obtaining the same results in a commercial-scale apparatus as in a laboratory-scale reactor; and often due to a polymerization parameter's having an effect, or side-effect, in a given type of polymerization process that is different from effects achieved by its use in prior art processes of a different type.

One aspect of Ziegler catalysts in which the need for further research has been found to exist has been in the field of preparing ethylene polymers having a narrow molecular weight distribution and a good balance of physical properties. Such polymers have particular application in the production of articles that are formed by injection molding; typically have molecular weight distributions such that their normalized $V_{30}/V_{300}$ melt viscosity ratios are in the range of about 1.5 to 2.3, with the ratios in the lower portion of this range being generally preferred but difficult to attain with known processes that might otherwise be commercially feasible; and—like other polymers intended for commercial use—are desirably prepared by a process which is as economical as possible as well as being capable of producing a polymer having the desired properties.

There are, of course, known processes for preparing injection molding resins by polymerizing ethylene with the aid of Ziegler catalysts. However, the known processes typically suffer one or more of the disadvantages of lack of economy, inability to produce polymers having a suitable balance of properties, and/or unrealiability in producing such polymers-particularly in commercial-scale operations. U.S. Pat. No. 4,003,712 by Miller teaches a gas-phase fluidized bed system and process which are capable of being scaled up to commercial size and, being solvent-free, would be less expensive than processes which use solvents or liquid diluents. However, Miller's silyl chromate catalysts do not give polymers of the desired narrow molecular weight distribution and good balance of physical properties. His system contains some features which tend to shorten commercial "on-stream" time. He does not teach how to avoid polymer build up on reactor surfaces, a phenonomenon variously referred to as "coating", "fouling", or "sheeting".

What is still needed is a process employing a catalyst which (a) is suitable for use in a gas-phase polymerization process, (b) is capable of yielding polymers having a narrow molecular weight distribution and a good balance of physical properties, (c) has sufficient activity to be economically attractive, and (d) does not cause reactor wall fouling, and (e) a gas-phase fluidized bed process which allows the catalyst to perform at its full potential at commercial scale.

British Pat. No. 1,489,410 (Monsanto) teaches gas-phase polymerization processes which, because of their use of supported Ziegler catalysts having a vanadium component and other factors, are commercially attractive processes. However, as taught in the patent, the processes are designed to result in the formation of polymers having the broad molecular weight distributions suitable for blow molding resins rather than the narrower molecular weight distributions needed for injection molding resins; and the patent itself does not suggest how its processes might be modified to result in the formation of polymers having narrower molecular weight distribution. Attempts to make the processes of the patent suitable for the preparation of injection molding resins by combining its teachings with the teachings of publications that discuss means of narrowing molecular weight distribution have not been successful. For example, polymers having a sufficiently narrow moleccular weight distribution have not been obtained when Monsanto's preferred vanadium halides have been replaced with the alkoxy group-containing vanadium compounds which are within the scope of their patent and which U.S. Pat. Nos. 3,457,244 (Fukuda et al.) and 3,655,583 (Yamamoto et al.) teach to result in the production of polymers having narrower molecular weight distributions when unsupported catalyst systems are employed.

U.S. Pat. No. 2,965,626 by Pilar et al discloses polymerizing organic compounds containing ethylenic unsaturation under relatively mild polymerization conditions with catalysts and alcohol catalyst promoters. More specifically, Pilar et al found that the polymerization activity of the catalyst prepared by reaction of alkali reagents with the specified metal salts can be substantially increased by the inclusion of an alcohol in the reaction zone. U.S. Pat. No. 3,163,611 by Andersen et al. pertains to the production of high density polyethylene by polymerizing ethylene in the presence of a catalyst exemplified by the material obtained by the interaction of a trialkylaluminum with titanium tetrachloride. U.S. Pat. No. 3,202,645 to Yancey presents a process for polymerizing and copolymerizing alpha mono and di-olefins by a catalyst comprising (a) the product of the reaction between a compound of a metal chosen from the group consisting of the metals of Groups IIb and IIIb (where the group numbers correspond to the Mendeleev Periodic Table) and hydroxyl groups on the surface of a finely-divided particulate inorganic solid, preferably finely-divided silica or alumina, and (b) a halide-type compound of a Group IVa, V, VIa, VIIa, or period 4 of Group VIII metal. The polymerization or copolymerization reaction can be effected at suitable temperatures within the range of from about $-25°$ C. to about 250° C., and pressures ranging from below atmospheric upwardly to any desired maximum pressure, for example, 30,000 p.s.i.g. or even higher pressures. U.S. Pat. No. 3,219,652 by Hill et al discloses an additive modified Ziegler-type catalyst comprising the combination of an organometallic compound and a transition metal halide of a conventional Ziegler-type catalyst and a polyether or hydroxyether. U.S. Pat. No. 3,718,636 to Stevens et al teaches obtaining polyolefins having a wide distribution of molecular weights through the use of catalysts comprising an organometallic compound and a solid complex component obtained by reacting a solid bivalent metal compound with an impregnation agent which consists of an organometallic compound, separating the solid reaction product, and reacting the solid reaction product with a halogenated derivative of a transition metal. Stevens et al teaches in U.S. Pat. No. 3,787,384 another catalyst suitable for use in olefin polymerization and olefin copolymerization which comprises (a) at least one organometallic compound, and (b) a solid catalytic component obtained by reacting a support compound of silica, alumina or both silica and alumina with a compound of the formula $MR_nX_{m-n}$ in which M is aluminum or magnesium, R is a hydrocarbon radical containing 1 to 20 carbon atoms, X is hydrogen or a halogen, m is the valence of M, and n is a whole number not less than 1 nor greater than m, separating the solid product of the reaction, reacting said product with an excess of a halogen-containing transition metal compound, and separating the solid reaction product. U.S. Pat. No. 3,925,338 to Ort teaches that control of particle size of olefin polymers produced by gas-phase polymerization of at least one olefin using Ziegler-type catalysts deposited on solid supports in a fluidized-solids operation is effected by controlling the particle size of the catalyst support. U.S. Pat. No. 4,232,140 also to Ort discloses the use of trichlorofluoromethane as a promoter in the polymerization and copolymerization of the ethylene with supported Ziegler-type vanadium compound/alkylaluminum compound catalysts in the presence of hydrogen. Ort finds that polymer yields with his supported vanadium-based catalysts are too low for commercial viability unless the catalyst is promoted to high yield with the trichlorofluoromethane promoter. The viscosity ratio data in Ort's examples, which may be related to molecular weight distribution, indicate that none of the polymers have narrow molecular weight distribution. Ort does not teach or suggest how to avoid reactor fouling.

Fukuda et al in U.S. Pat. No. 3,457,244 also teach that ethylene copolymers or terpolymers having narrow molecular weight distribution can be obtained by the use of an unsupported catalyst composition prepared by (1) mixing an alcohol containing 1 to 12 carbon atoms with $VOCl_3$ and then (2) mixing the mixture thus obtained with an alkylaluminum compound in the presence of the monomers to be interpolymerized, and there are other patents, e.g. Stamicarbon's British Pat. No. 1,175,593 and U.S. Pat. Nos. 3,535,269 (Tanaka et al.), 4,071,674 (Kashiwa et al.), and 4,256,865 (Hyde et al.) which teach the use of catalyst compositions prepared by adding an alcohol at some stage during the catalyst preparation. However, although some of these patents are concerned with the production of polymers having narrow molecular weight distribution, none of the prior art teaches or suggest an economical, gas-phase, fluidized bed process and catalyst for commercially producing ethylene polymers of narrow molecular weight distribution and a good balance of physical properties.

SUMMARY OF THE INVENTION

An object of the invention is to provide an economical, commercial polymerization process for preparing ethylene polymers having narrow-to-intermediate molecular weight distribution and a good balance of physical properties.

Another object is to provide non-fouling catalyst compositions useful in an economical gas-phase process for polymerizing one or more monomers comprising ethylene to polymers having a narrow-to-intermediate molecular weight distribution and a good balance of physical properties.

The foregoing objects of this invention are broadly accomplished by providing a process of polymerizing a monomer charge including ethylene comprising the steps of:

(a) drying an inorganic oxide having surface hydroxyl groups to form a support that is substantially free of adsorbed water;

(b) reacting the surface hydroxyl groups of the support with at least a substantially stoichiometric amount of at least one organometallic compound corresponding to the formula $R_xMR'_yR''_z$, wherein M is a metal of Group III of the periodic table, R is an alkyl group containing 1 to 12 carbon atoms, R' and R" are independently selected from the group consisting of H, Cl, and alkyl and alkoxy groups containing 1 to 12 carbon atoms, x has a value of 1 to 3, and y and z both represent values of 0 to 2, the sum of which is not greater than $3-x$;

(c) reacting the thus-treated support with at least about 0.001 mol, per mol of organometallic compound, of at least one vanadium compound corresponding to a formula selected from $(RO)_nVOX_{3-n}$ and $(RO)_mVX_{4-m}$, in which formulas R represents a $C_1$-$C_{18}$ monovalent hydrocarbon radical that is free of aliphatic unsaturation, X is Cl or Br, n has a value of 0 to 3, and m has a value of 0 to 4;

(d) reacting the product of step (c) with at least about 0.1 mol, per mol of organometallic compound, of an ether-alcohol corresponding to the formula $R''[OCHR'(CH_2)_nCHR]_mOH$, wherein R and R' are independently selected from the group consisting of hydrogen and alkyl groups containing 1-18 carbon atoms, R" is a hydrocarbyl group, n has a value of 0 to 16, and m has a value of at least 1;

(e) feeding the product of step (d) into a gas-phase reaction zone;

(f) feeding, separately and independently of said feeding step (e), a trialkylaluminum into the gas-phase reaction zone in order that a bed in the gas-phase reaction zone comprises particulate polymerized substantially ethylene particles, the product of step (d) and the trialkylaluminum;

(g) fluidizing the bed of step (f) at a pressure of between about 0.7 and 4.2 MPa and a temperature of between about 50° to 120° C. by diffusing underneath the bed of step (f) a gas mixture comprising ethylene, hydrogen, and chloroform at a rate sufficient enough to give a linear gas velocity in the bed of step (f) of between about 15 to 60 cm/sec;

(h) removing particulate polymerized substantially ethylene particles from the reaction zone; and (i) recycling unreacted gas mixture of step (g) from the top of the reaction zone to the bottom of the reaction zone.

DETAILED DESCRIPTION OF THE INVENTION

This invention is a novel process of polymerizing a monomer charge having ethylene. An inorganic oxide with surface hydroxyl groups is dried to form a support that is substantially free of adsorbed water. The surface hydroxyl groups of the support are reacted with at least a substantially stoichiometric amount of at least one organometallic compound corresponding to the formula $R_xMR'_yR''_z$, wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than $3-x$. The thus-treated support is reacted with at least about 0.001 mol, per mol of organometallic compound, of at least one vanadium compound corresponding to a formula selected from $(RO)_nVOX_{3-n}$ and $(RO)_mVX_{4-m}$, in which formulas R represents a $C_1$-$C_{18}$ monovalent hydrocarbon radical that is free of aliphatic unsaturation, X is Cl or Br, n has a value of 0 to 3, and m has a value of 0 to 4. This product is reacted with at least about 0.1 mol, per mol of organometallic compound, of an ether-alcohol corresponding to the formula $R''[OCHR'(CH_2)_nCHR]_mOH$, wherein R and R' are independently selected from the group consisting of hydrogen and alkyl groups containing 1-18 carbon atoms, R'' is a hydrocarbyl group, n has a value of 0 to 16, and m has a value of at least 1, in order to form a catalyst product. The catalyst product is fed into a gas-phase reaction zone. Separately and independently of this feeding, a trialkylaluminum is fed into the gas-phase reaction zone in order to form a bed in the gas-phase reaction zone which includes the catalyst product and the trialkylaluminum. The bed is fluidized at a pressure of between about 0.7 and 4.2 MPa and a temperature of between about 50° to 120° C. by diffusing underneath the catalyst product-trialkylaluminum bed a gas mixture comprising ethylene, hydrogen, and chloroform at a rate sufficient enough to give a linear gas velocity in the catalyst product-trialkylaluminum bed of between about 15 to 60 cm/sec. Particulate polymerized substantially ethylene particles are removed from the reaction zone, and unreacted gas mixture of ethylene, hydrogen and chloroform is recycled from the top of the reaction zone to the bottom of the reaction zone.

The inorganic oxide used in preparing a catalyst composition of the invention may be any particulate inorganic oxide or mixed oxide, e.g., silica, alumina, silica-alumina, magnesia, zirconia, thoria, titania, etc., having surface hydroxyl groups capable of reacting with the organometallic compound. However, it is generally an inorganic oxide selected from the group consisting of silica, alumina, magnesia and mixtures thereof, i.e., physical mixtures, such as mixtures of silica and alumina particles, etc., and/or chemical mixtures, such as magnesium silicate, aluminum silicate, etc. The surface hydroxyl groups may be at the outer surface of the oxide particles or at the surfaces of pores in the particles, the only requirement in this regard being that they be available for reaction with the organometallic compound.

The specific particle size, surface area, pore volume, and number of surface hydroxyl groups characteristic of the inorganic oxide are not critical to its utility in the practice of the invention. However, since such characteristics determine the amount of inorganic oxide that it is desirable to employ in preparing the catalyst compositions, as well as sometimes affecting the properties of polymers formed with the aid of the catalyst compositions, these characteristics must frequently be taken into consideration in choosing an inorganic oxide for use in a particular aspect of the invention. For example, when the catalyst composition is to be used in a gas-phase polymerization process—a type of process in which it is known that the polymer particle size can be varied by varying the particle size of the support—the inorganic oxide used in preparing the catalyst composition should be one having a particle size that is suitable for the production of a polymer having the desired particle size. In general, optimum results are usually obtained by the use of inorganic oxides having an average particle size in the range of about 30 to 600 microns, preferably about 30 to 100 microns; a surface area of about 50 to 1000 square meters per gram, preferably about 100 to 400 square meters per gram; and a pore volume of about 0.5 to 3.5 cc per gram, preferably about 0.5 to 2 cc per gram.

As indicated above, the organometallic compound that is reacted with the surface hydroxyl groups of the inorganic oxide in the practice of the invention may be any one or more organometallic compounds corresponding to the formula $R_xMR'_yR''_z$, wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than $3-x$. Thus, M may be, e.g. aluminum, gallium, indium, or thallium; R may be, e.g., methyl, ethyl, propyl, isopropyl, n-butyl, n-pentyl, isopentyl, t-pentyl, hexyl, 2-methylpentyl, heptyl, octyl, 2-ethylhexyl, nonyl, decyl, dodecyl, etc; R', when present, may be H, Cl, and alkyl group, such as one of those exemplified above for R, which is the same as or different from R, or an alkoxy group, such as the alkoxy groups corresponding to the aformentioned alkyl groups; and R'', when present, may be any of the substituents mentioned above as exemplary of R' and may be the same as or different from R'.

The preferred organometallic compounds are those in which M is aluminum. Utilizable aluminum compounds included chlorides, such as dimethylaluminum chloride, diethylaluminum chloride, dipropylaluminum chloride, diisobutylaluminum chloride, the corresponding alkylaluminum dichlorides, etc., and mixtures of such chlorides, but the chlorides are generally not particularly preferred because of the halogen residue they contribute to polymers made in their presence. The more preferred aluminum compounds are the trialkylaluminums, dialkylaluminum hydrides, dialkylaluminum alkoxides, and alkylaluminum dialkoxides, such as trimethylaluminum, triethylaluminum, tripropylaluminum, tributylaluminum, triisobutylaluminum, isoprenylaluminum, trihexylaluminum, trioctylaluminum, tridecylaluminum, tridodecylaluminum, etc.; the corresponding alkoxy compounds wherein one or two of the alkyl groups have been replaced by alkoxy groups, such as ethylaluminum diethoxide, diethylaluminum ethoxide, ethylaluminum sesquiethoxide, ethylaluminum diisopropoxide, etc.; diethylaluminum hydride, di-n-propylaluminum hydride, diisobutylaluminum hydride, etc.; and mixtures of such compounds.

Especially preferred aluminum compounds are the trialkylaluminums, particularly triethylaluminum and tri-n-hexylaluminum, which are advantageous to employ because of their cost, availability, and/or effectiveness.

The amount of organometallic compound employed is at least substantially the stoichiometric amount, i.e., the amount required to react with all of the available hydroxyl groups on the inorganic oxide. Use of an amount less than the substantially stoichiometric amount would broaden the molecular weight distributions of polymers formed in the presence of the catalyst compositions. Use of an amount greater than the substantially stoichiometric amount is permissible within the scope of the invention but frequently serves no practical purpose and can be disadvantageous in that the excess organometallic compound sometimes leads to fouling of the polymerization reactor if not removed from the catalyst composition prior to the composition's being used.

When the number of available hydroxyl groups on the particular inorganic oxide being treated is not known, it can be determined by any conventional technique, e.g., by reacting an aliquot of the inorganic oxide with excess triethylaluminum and determining the amount of evolved ethane. Once the number of available hydroxyl groups on the inorganic oxide is known, the amount of organometallic compound to be employed is chosen so as to provide at least about one mol of organometallic compound per mol of available hydroxyl groups.

The vanadium component of the catalyst compositions of the invention may be any one or more compounds corresponding to a formula selected from $(RO)_nVOX_{3-n}$ and $(RO)_mVX_{4-m}$, wherein R represents a monovalent hydrocarbon radical that contains 1 to 18 carbon atoms and is free of aliphatic unsaturation, X is Cl or Br, n has a value of 0 to 3, and m has a value of 0 to 4. Thus, the utilizable vanadium compounds include $VOCl_3$, $VOBr_3$, and the indicated mono-, di-, and trihydrocarbyloxy derivatives thereof, as well as $VCl_4$, $VBr_4$, and the indicated mono-, di-, tri-, and tetrahydrocarbyloxy derivatives thereof; and R, when present, may be a straight- or branched-chain alkyl, cycloalkyl, aryl, alkaryl, or aralkyl group, such as methyl, ethyl, propyl, isopropyl, butyl, isobutyl, pentyl, hexyl, cyclohexyl, heptyl, octyl, cyclooctyl, nonyl, decyl, dodecyl, hexadecyl, octadecyl, phenyl, benzyl, dimethylphenyl, ethylphenyl, etc. When mixtures of vanadium compounds are employed, the vanadium component may be a mixture of two or more compounds corresponding to either of the general formulas given above or a mixture of one or more compounds corresponding to one of those general formulas with one or more compounds corresponding to the other of those general formulas.

Ordinarily, when a vanadium compound of the $(RO)_nVOX_{3-n}$ type is employed, it is preferably a compound wherein X is Cl, R (when present) is alkyl, and n is 0 or 1, because of the greater availablity of such compounds; and, for the combined reasons of cost, availability, and effectiveness, it is most perferably $VOCl_3$.

Ordinarily, when a vanadium compound of the $(RO)_mVX_{4-m}$ type is employed, it is preferably $VCl_4$ or a derivative thereof, most preferably $VCl_4$ itself. The use of $VCl_4$ in the preparation of catalyst compositions of the invention leads to the formation of compositions which are so satisfactory in the production of injection molding-grade ethylene polymers that there is seldom any reason to use a more expensive $(RO)_mVX_{4-m}$ compound instead of it.

The amount of vanadium compound(s) employed in the practice of the invention may be varied considerably but is generally such as to provide at least about 0.001 mol of vanadium compound per mol of organometallic compound. When the catalyst composition is to be prepared by the preferred process described below, wherein no washing step is utilized during or after preparation of the compositions, the amount of vanadium compound employed should not be substantially in excess of the amount capable of reacting with the treated support, i.e., about 1 mol of vanadium compound per mol of organometallic compound. Use of a greater amount would serve no practical purpose and could be disadvantageous in that the excess vanadium compound could lead to fouling of the polymerization reactor. However, a larger amount of vanadium compound may be employed when fouling of the reactor is not expected to be a problem and/or excess vanadium compound will be removed from the catalyst composition before the composition is used. In the practice of the invention, the amount of vanadium compound employed is generally not in excess of about 3 mols per mol of organometallic compound, and excellent results are obtained by the use of about 0.03 to 0.2 mol of vanadium compound per mol of organometallic compound, i.e. about 5 to 30 mols of organometallic compound per mol of vanadium compound.

As indicated above, the ether-alcohol employed in preparing the present catalyst composition may be any ether-alcohol corresponding to the formula $R''[OCHR'(CH_2)_nCHR]_mOH$, wherein R and R' are independently selected from the group consisting of hydrogen and alkyl groups containing 1 to 18 carbon atoms, R'' is a hydrocarbyl group, n has a value of 0 to 16, and m has a value of at least 1. Thus, when not hydrogen, R and/or R' may be, e.g. methyl, ethyl, propyl, hexyl, nonyl, dodecyl, octadecyl, etc; R'' may be any such alkyl group, an alkyl group containing a greater number of carbon atoms, an aralkyl group, such as benzyl, or—more preferably—an aralkyl group having an alkyl chain of at least two carbon atoms; and there is no upper limitation to the value of m as far as effectiveness of the compounds is concerned. However, considering the combined attributes of cost, availability, and effectiveness, the preferred ether-alcohols are those in which R and R' are hydrogen, R'' is an alkyl group, most preferably an alkyl group containing 1 to 18 carbon atoms, n has a value of 0 or 1, and m has a value of 1 to 3.

The most preferred ether-alcohols are compounds corresponding to the formula $CH_3(CH_2)_n[OCH_2CH_2]_mOH$, wherein n has a value of 0 or 1 and m has a value of 1 or 2.

The amount of ether-alcohol used in preparing the catalyst compositions of the invention should be at least about 0.1 mol per mol of organometallic compound employed. There is no maximum amount of ether-alcohol that may be utilized, but its beneficial effects begin decreasing when an optimum amount is exceeded, so it is generally not used in excess of 10 mols per mol of organometallic compound. Ordinarily, the amount of ether-alcohol utilized in the practice of the invention is in the range of about 0.2 to 3, preferably about 0.3 to 1, most preferably about 0.35 to 0.8, mols per mol of organometallic compound.

As indicated above, the catalyst compositions of the invention are prepared by drying the inorganic oxide, reacting the dried inorganic oxide with the organometallic compound, reacting the thus-treated support with the vanadium compound, and then reacting that reaction product with the ether-alcohol. The conditions under which the inorganic oxide are dried are not critical as long as they are adequate to provide an inorganic oxide that has surface hydroxyl groups and is substantially free of adsorbed water. However, it is ordinarily preferred to dry the inorganic oxide at about 100°-1000° C., with or without a nitrogen or other inert gas purge, until substantially all adsorbed water is removed. Also, although improved results are obtained by the use of the catalyst compositions of the invention, regardless of the particular temperature at which the inorganic oxide is dried, the drying temperature has been found to have a negligible-to-noticeable effect on those results—optimum results generally being obtained when the inorganic oxide has been dried at about 200°-600° C., but drying temperatures of about 500° to 600° C. generally being preferred for optimum results when the inorganic oxide is alumina. The time required for drying of the inorganic oxide varies, of course, with the particular drying temperature used but is usually in the range of about 5-16 hours.

When the inorganic oxide has been substantially freed of adsorbed water, its surface hydroxyl groups may be reacted with the organometallic compound in any suitable manner, conveniently by (1) adjusting its temperature, if necessary, to the temperature at which the reaction with the organometallic compound is to be conducted, (2) slurrying it in an inert liquid hydrocarbon, generally a $C_4-C_8$ hydrocarbon, such as isobutane, pentane, isopentane, hexane, cyclohexane, heptane, isooctane, etc., and mixtures thereof with one another and/or with other materials commonly present in commercial distillation cuts having the desired boiling range, (3) adding a substantially stoichiometric amount of the organometallic compound in neat or solution form, and (4) maintaining the organometallic compound in intimate contact with the inorganic oxide, e.g., by agitating the slurry, for a time sufficient to ensure substantially complete reaction with the available hydroxyl groups, generally at least about 5 minutes. The reaction may be conducted with or without pressure and at ambient or reflux temperatures, depending on the particular organometallic compound employed, as will be readily understood by those skilled in the art. When the organometallic compound is added in solution form, it is generally preferred, though not required, that the solvent be the same inert liquid hydrocarbon as is already present in the slurry.

The reaction of the vanadium component with the treated support may also be accomplished by conventional means, such as any of the techniques described in British Pat. No. 1,489,410, the teachings of which are incorporated herein by reference. However, it is most desirably accomplished simply by adding the vanadium compound in neat or solution form to the slurry of treated support and maintaining it in intimate contact with the treated support for a time sufficient to provide for substantially complete reaction, usually at least about 5 minutes and preferably about 10-60 minutes, although, actually, the reaction is virtually instantaneous.

When reaction of the vanadium component with the treated support has been completed, reaction with the ether-alcohol may be accomplished in any suitable manner, conveniently by just adding the ether-alcohol to the vanadium component/treated support reaction product and maintaining it in contact therewith, e.g., by agitating the slurry, for a time sufficient to ensure substantial completion of the desired reaction, usually at least about 5 minutes and most commonly about 30-60 minutes.

After the ether-alcohol has been reacted with the other catalyst components, the resultant catalyst composition may or may not require further treatment to make it suitable for use, depending on the particular process that has been used to prepare the catalyst composition and the particular type of polymerization process in which it is to be used. For example, if the catalyst composition has been prepared by a type of process which results in its being already dry when reaction with the ether-alcohol has been accomplished, no further treatment is likely to be necessary if the composition is to be used in a gas-phase polymerization process; but slurrying of the composition in a suitable liquid medium may be desirable if it is to be used in a slurry or solution polymerization process. On the other hand, if the catalyst composition has been prepared by the preferred process described above, i.e., if the inorganic oxide has been slurried in a liquid medium prior to the addition of the other components, it is already suitable for use in a slurry or solution polymerization process but will have to be dried to make it suitable for use in a gas-phase polymerization process. When the composition is to be dried, i.e., freed of any liquid medium used in its preparation, the drying may be achieved by any conventional technique, e.g., filtration, centrifugation, evaporation, blowing with nitrogen, etc. Commerical preparation of the catalyst of this invention is preferably carried out as taught by Rogers in U.S. Pat. No. 4,426,317.

Regardless of the particular technique used to prepare the catalyst compositions of the invention, it should be kept in mind that they are Ziegler catalysts and are therefore susceptible to poisoning by the materials, such as oxygen, water etc, that are known to reduce or destroy the effectiveness of Ziegler catalysts. Accordingly, they should be prepared, stored, and used under conditions that will permit them to be useful as polymerization catalysts, e.g. by the use of an inert gas atmosphere, such as nitrogen.

The invention is particularly advantageous in that it provides catalyst compositions which (1) have the active ingredients chemically-attached to an inorganic oxide support, (2) are capable of producing ethylene polymers having a narrow-to-intermediate molecular weight distribution, as desired, and a good balance of physical properties by an economical gas-phase process that gives a high yield of polymer and (3) do not foul gas phase reactors. The fact that high yields of polymer can be obtained by the use of the catalyst compositions is particularly unexpected in that these high yields are attainable even when the catalyst compositions are prepared by the preferred process wherein no washing step is required or utilized during or after preparation of the compositions. Both experience in the field and the teachings of the prior art indicate that at least one washing step should be required in the preparation of such compositions when high yield catalysts are desired.

After the catalyst composition of this invention is prepared, it is subsequently introduced into a gas-phase fluidized reactor similar to that taught by Miller in U.S. Pat. No. 4,003,712 which will be incorporated by reference herein. In a preferred embodiment of the invention, the diameter of the velocity reduction or disengaging zone at the top of Miller's reactor is enlarged and the cyclone and filter in the gas recycle system are eliminated for stable, long-term commercial operation. It should be understood that polymerization with the catalyst compositions of this invention may be conducted in any fluidized system which has a distribution plate means and allows a monomer gas to fluidize a bed including the catalyst composition; allows unreacted monomer gas to be recycled from the top of the fluidized system back to the bottom of the fluidized system or for admixing with the monomer gas prior to its diffusing or passing through the fluidized bed; allows a polymer product to be withdrawn from the fluidized bed; allows catalyst and a trialkylaluminum to be added to the fluidized bed; and provides for the removal of the heat of polymerization. Size, shape, pressure rating, heat removal capability, and other factors can limit the polymer production capacity of the gas-phase fluidized-bed reaction systems of this invention. The process of this invention may be practiced in commercial facilities having production capacities of 50,000 to 250,000 metric tons per year or more. The process of this invention may also be practiced in laboratory scale reactors having a production capacity of from about 0.1 to 1.0 kg/hr or in pilot plant reactors having production capacities of from about 5 to 500 kg/hr.

The catalyst composition of this invention should preferably be injected or fed to the fluidized bed system at a point between the distribution plate and about 7/8 of the height of the fluidized bed from the distribution plate of the reactor. More preferably, the catalyst composition is fed into the fluidized bed system at a point of between about $\frac{1}{8}$ to about $\frac{1}{2}$ of the height of the fluidized bed. Injection of the catalyst composition above about $\frac{1}{8}$ of the height of the bed (as opposed to below $\frac{1}{8}$ of the height) offers distribution of the catalyst compositions throughout the entire ongoing fluidized bed to retard and/or preclude the formation of localized spots of high catalyst composition concentration which would result in the formation of "hot spots" at or near the distribution plate. A "hot spot" is a localized region in which the exothermic heat of polymerization is not dissipated before some polymer heats to the softening point of the polymer. Any introduction of the catalyst composition of this invention at a point above about 7/8 of the height of the fluidized bed from the distribution plate of the reactor may lead to excessive carryover of the fresh catalyst of this invention into the gas recycle system. The rate of injection or rate of feed of the catalyst composition of this invention is any suitable rate which is equal to catalyst consumption in the polymerization process of this invention and generally depends on the size of the fluidized bed system. The rate of production of the particulate polymerized substantially ethylene particles in the fluidized bed is partly determined by the rate of catalyst injection. We have found that the rate of injection of the catalyst for our polymerization process is generally preferably at a rate that maintains the concentration of the vanadium in the fluidized bed between about 1/10 ppm to about 50 ppm based on weight of vanadium metal divides by total solids in the bed. More preferably, the rate of injection of the catalyst is that which would maintain the concentration of vanadium in the fluidized bed between about 0.50 ppm to about 10 ppm; most preferably, between about 1 ppm to about 4 ppm. The fluidized bed is substantially particulate polymerized ethylene polymer particles formed by polymerization of the polymer on the catalyst compositions of this invention.

In order for the catalyst composition of this invention to give high yield of polymer product per unit of vanadium component, we have discovered that it is necessary to add or inject at least one trialkylaluminum compound into the fluidized bed system as a co-catalyst. For a variety of reasons, it is preferred to add the trialkylaluminum compound, or the mixture of trialkylaluminum compounds, that is being used as co-catalyst directly to the fluidized bed separately and independently of the catalyst and at an injection point removed from the catalyst injection point. However, the process of this invention does not depend on the method of feeding the trialkylaluminum co-catalyst or the location of its injection point. The trialkylaluminum compounds of this invention may be fed to the fluidized bed as pure compounds, or in solution in a liquid hydrocarbon which will vaporize in the fluidized bed. Suitable hydrocarbon solvents include, but are not limited to, isobutane, isopentane, hexane, heptane, and mixtures thereof.

The trialkylaluminum of this invention may be any trialkylaluminum wherein the alkyl or combination of alkyl groups contain between 1 and about 36 carbon atoms. In a preferred embodiment of the invention, the alkyl group or combination of alkyl groups contain between 1 and about 12 carbon atoms. Suitable trialkylaluminum compounds have been found to include trimethyl-, triethyl-, tri-i-butyl-, tri-n-hexyl-, tri-n-octyl- and ethyl di-i-butylaluminum. It should be understood that trialkylaluminum compounds add ethylene, and alpha olefins to some extent, under the operating temperatures and pressures of the polymerization process of the invention. Thus, an ethyl group on aluminum may be inserted by ethylene to become a butyl group, etc. Therefore, there is no reason to believe or require that all alkyl groups on the aluminum be the same. There is every reason to believe that mixtures of trialkylaluminum compounds are generated during polymerization and are as effective as pure compounds. Since the exact composition of the alkyl groups on aluminum during the polymerization process of this invention is not known because of the ethylene insertion reaction, all of the trialkylaluminum species in the fluidized bed are referred to collectively for the purposes herein as "trialkylaluminum".

As was the case for the catalyst composition of this invention, the rate of injection of the trialkylaluminum is also any suitable rate which is equal to the trialkylaluminum consumption in the polymerization process, and also depends on the size of the fluidized bed system. Polymer productivity from the polymerization process is not only determined by the rate of catalyst injection, but also from the rate of trialkylaluminum injection.

Assuming that the trialkylaluminum compounds of this invention remain in the fluidized bed and assuming uniform distribution of trialkylaluminum throughout the fluidized bed, the molar concentration of trialkylaluminum may be calculated from the molar feed rate of the trialkylaluminum being fed into the fluidized bed reaction system and the withdrawal rate of the polymer product particles. Likewise, assuming uniform distribution of the catalyst composition throughout the fluidized bed, the molar concentration of the vanadium component of the catalyst composition may be calculated from the molar feed rate of the vanadium component of the catalyst composition being fed into the fluidized bed reaction system and the withdrawal rate of the polymer product particles. At stable, lined-out operating conditions, the ratio of the molar concentration of the trialkylaluminum to the molar concentration of the vanadium component in the fluidized bed will asymptote to the ratio of the molar feed rate of the trialkylaluminum to the molar feed rate of the vanadium component of the catalyst composition of this invention. For the catalyst compositions of this invention, the injection rate of the trialkylaluminum should be such that the Al/V ratio in the fluidized bed of the molar concentration of the trialkylaluminum to the molar concentration of the vanadium component is between about 1 to about 5,000. We have found that the activity of the catalyst composition of the invention is maximized in a certain range of trialkylaluminum to vanadium molar ratio. Too little or too much trialkylaluminum suppresses the activity of the catalyst composition and the polymer production. It has been determined that a plot of the trialkylaluminum to vanadium molar ratio versus the catalyst (of this invention) activity possesses a generally flat peak and the optimum trialkylaluminum to vanadium molar ratio lies in the range of from about 2 to about 500, with from about 2 to 60 being the most preferred from the standpoint of minimizing catalyst residue levels in the polymer and trialkylaluminum cost. Therefore, the preferred injection rate of the trialkylaluminum into the fluidized bed system of this invention is that injection rate wherein the molar ratio in the catalyst bed of the molar concentration of the trialkylaluminum to the molar concentration of the vanadium composition is between about 2 to 500, and most preferably from about 2 to about 60.

The bed of particulate polymerized substantially ethylene particles, trialkylaluminum and the catalyst composition of this invention has to be fluidized at a pressure of between about 0.7 and 4.2 MPa and a temperature of between about 50° to 120° C. Fluidization is conducted by diffusing underneath the bed (and through the distribution plate) a gas mixture comprising ethylene, hydrogen and chloroform at a rate sufficient enough to give a linear gas velocity in the bed of between about 15 to about 60 cm/sec. The gas mixture will also include inert gas which is used to feed the catalyst compositions to the fluidized bed. A majority of the gas mixture is in the form of unreacted gas mixture that is recycled from the top of the reaction zone to the bottom of the fluidized bed of the reaction zone.

Although the catalyst composition and the trialkylaluminum of this invention polymerize ethylene and other olefins over a wide range of temperatures, there is a practical limitation to the temperatures at which the gas-phase fluidized-bed process of this invention is commercially viable. For example, above about 120° C., ethylene polymers soften and tend to agglomerate in a fluidized bed, leading to formation of lumps, loss of fluidization, and onset of an inoperable condition. Below about 50° C., the production rate of commercial reactors becomes so low that the process is no longer profitable. It is generally desirable to operate near the highest temperature at which the polymer will not agglomerate in the bed with a temperature safety factor for small temperature upsets so that inoperable conditions are not encountered even briefly. Therefore, the preferred temperature range is from about 65°–115° degrees C., with the range from about 75°–110° degrees C being most preferred.

The pressure at which the polymerization process of this invention is conducted is selected on the basis of desired commercial operation rather than upon some limitation of the catalyst. The catalysts of this invention will function at atmospheric, subatmospheric, or superatmospheric pressures. For economy of operation, one wishes to polymerize near the highest pressure for which the equipment is designed in order to maximize the production rate for the equipment. But, because commercial process equipment generally is more expensive with the higher pressure, there is a natural tendency to design commercial equipment for low pressures. These constraints lead to a commercial operating range of about 0.7–4.2 MPa. At the lower pressures, however, higher dwell or residence times in the reactor are required to reach high yields of polymer per unit of catalyst. At the higher pressures, there is little room to safely accommodate pressure upsets. These constraints lead to a preferred pressure range of about 1.6–3.9 MPa.

In order to provide sufficient mixing and agitation in the bed of polyethylene particles, trialkylaluminum and catalyst that "hot spots" will not develop, it is necessary that the flow rate of the gas mixture through the bed of polymer particles containing traces of the catalyst and the trialkylaluminum be sufficient to fluidize the particles. For the powdered polymer particles produced by the catalysts of this invention, the minimum fluidization velocity, $G_{mf}$, has been determined to be about 15 cm/sec. As gas velocity increases, a point is reached at which the particles are largely swept out of the bed by the force of the rising gas (the transport velocity), which, for the particles of the present invention is about 4 $G_{mf}$, or 60 cm/sec. To provide some margin for operating error, the preferred velocity range is about 1.5–3.0 $G_{mf}$, or about 23–45 cm/sec, in contrast to the 3–5 $G_{mf}$ range preferred by Miller in U.S. Pat. No. 4,003,712 for his catalysts.

The catalysts of this invention, under the commercial conditions described above, in the absence of a chain transfer agent, produce polymer of a molecular weight too high for conventional melt processing. Therefore, in the commercial practice of this invention the fluidizing gas mixture must contain hydrogen during polymerization to adjust the molecular weight (as determined by melt index) to the desired range for the product being produced. This is done by increasing the hydrogen/ethylene ratio to raise melt index (lower molecular weight), or reducing the ratio to produce the opposite effect. The catalysts of this invention are sensitive to hydrogen, so it is generally not necessary to use more than 10% by vol. of hydrogen even to produce the highest melt index polymer. Furthermore, when used as described herein, altering the hydrogen/ethylene ratio to increase melt index does not cause a loss of production rate in a commercial plant within the range of melt indexes used for commercial polymers at this time. Preferably, the amount of hydrogen utilized in a preferred embodiment of the invention in order to control the molecular weight of the produced polymer is between about 0.10% to about 10.0% by volume of the total gas mixture volume.

The gas mixture has to have chloroform in order that the catalyst compositions of this invention can have their activity promoted. While other halogenated carbon compounds such as methylene chloride and fluotrichloromethene may work as promoters, from the standpoints of promotion of catalyst activity, cost, availability, ease of handling, and catalyst promotion without causing reactor fouling, chloroform is clearly the compound of choice. Only small amounts are needed because of its effectiveness. Under the conditions of polymerization, it is a gas, and generally will be present in the recycle gas at concentrations between about 0.0001 to about 1.000% by vol. of the gas mixture. Since the preferred vol. % ranges for hydrogen and chloroform are respectively between about 0.10 and about 10.0 and between about 0.0001 and about 1.000, the remaining vol. % for any given volume of the gas mixture would include ethylene and any of the inert gas which is used to feed the catalyst compositions to the fluidized bed in the reaction zone. In a preferred embodiment of the invention, ethylene preferably comprises between about 50.0 vol. % and about 99.9 vol. % of the gas mixture.

It appears that the molar ratio $CHCl_3/V$ is more useful in predicting and understanding its effect than the overall concentration in the gas, since it seems to affect the catalyst's performance. The $CHCl_3/V$ ratio may vary from about 2 to about 5000. Because chloroform is relatively inexpensive and used in small amounts, there is no real economic incentive to minimize its use. However, there appears to a maximum in the curve of catalyst activity vs. $CHCl_3/V$ ratio, with a broad optimum in the range of about 10 − 500. There also appears to be an interaction between the optima for $CHCl_3/V$ ratio and $Al/V$ ratio such that lower $CHCl_3/V$ ratios are generally preferred when the $Al/V$ ratio is low, and higher $CHCl_3/V$ ratios are generally better when the $Al/V$ is high. Other factors, such as impurity levels, may also cause a shift in the optimum $CHCl_3/V$ ratio or $Al/V$ ratio, but generally such factors will not shift the optima outside the preferred ranges.

We have found that, in order to control the density of the produced ethylene polymer, the gas mixture of ethylene, hydrogen and chloroform may include alpha olefins which will be copolymerized with the ethylene of the gas mixture. Although the catalyst compositions of this invention will copolymerize essentially any alpha olefin with ethylene, there is a practical limit to what can be effectively done in a gas-phase reaction. Generally, olefins having more than 8 carbon atoms have too low a vapor pressure to be used in high enough concentration to have much effect on density. Propylene, butene-1, hexene-1, 4-methylpentene-1, and octene-1 are among the alpha olefins useful in copolymerization with ethylene in this invention. Preferably, mixtures of alpha olefins having 3 to 8 carbon atoms may be used in a preferred embodiment of this invention. By this process, polymers generally considered to be HDPE (densities of 0.940 or greater) and LLDPE (densities below 0.940) may be made equally well by adjusting comonomer concentration in the feed or other factors. The amount of comonomer needed is determined by the density of the polymer product being made. Generally, not less than 0.5 vol % of alpha olefin will be used and not more than 30 vol % of the alpha olefin will be utilized for any given volume of the gas mixture, along with any of the inert gas and between about 0.10 vol % and about 10.0 vol % of hydrogen, between about 0.0001 vol % and about 1.000 vol % chloroform, and between about 50.0 vol % and about 99.4 vol % ethylene.

The catalyst composition of this invention is preferrably fed to the gas-phase fluidized-bed reactor as a dry particulate matter, such as dry powder, under the inert gas. Any gas that does not react with the catalyst is considered inert. Suitable gases include nitrogen, argon, and methane. Any device which can measure and convey a free flowing powder is suitable for feeding the catalyst, although the device must not allow monomer to enter the catalyst storage area of the feed device. Once the catalyst has been measured and delivered to the catalyst feed line, any good method of conveying it to the fluidized bed may be used. These include mechanical means such as screw conveyers, or gas conveying with inert gas or, as Miller teaches, with gas conveying with inert gas or, as Miller teaches, with recycle gas from the reactor. Catalyst may be added continuously, semi-continuously, or discontinuously to the reactor. Continuous addition is preferred, but is virtually impossible at laboratory scale. Catalyst may be fed pure or may be diluted with any free-flowing particulate material such as pure, dry support or polymer powder from the reactor. In catalyst feeding, all that is really critical is that the catalyst be fed at a controlled rate and be dispersed in the bed before a "hot spot" develops.

The produced particulate polymerized substantially ethylene particles may be removed from the gas-phase reaction zone by any suitable means and at any suitable location. Preferably, the produced ethylene polymer particles are removed in accordance with the procedure described by Miller in U.S. Pat. No. 4,003,712. In a preferred embodiment of the invention, the produced ethylene polymer particles are removed from the gas-phase reaction zone above and in proximity to the distribution plate.

As has been mentioned, it is necessary to have good fluidization, good catalyst mixing, and good distribution of gas in the bed in order to avoid "hot spots" which cause lumps to form in the bed. These lumps themselves disturb fluidization so, once a lump forms, the tendancy for other lumps to form is enhanced. Eventually a reactor shut down is necessary because the process becomes inoperable.

Similarly, it is necessary for long-term, stable operation of commercial reactors that the surfaces of the reactor and distribution plate remain clean. If a polymer coating (fouling) builds up on a reactor surface, several undesirable things may happen. First, fouling on the distribution plate tends to perturb the desired gas distribution and restrict the ability of the polymer particles at the plate to move laterally. Both effects tend to produce "hot spots" at or near the distribution plate. Second, fouling on the reactor wall inhibits the normal downward motion of fluidized particles at the wall surface.

Particles which "hang up" at a wall surface can generate "hot spots". Third, the wall coating may come loose in places, fall into the bed, and disrupt fluidization as any lump would do. Even worse, wall fouling usually is in the form of a "sheet" rather than a lump, and produces severe gas channeling in the bed if it falls off.

Although poor selection of operating conditions or poor operating techniques may lead to lump formation, it appears that fouling of reactor surfaces depends primarily on the catalyst used. Some catalysts tend to produce fouling, and some do not. At this time, insufficient experience has been gained to be able to predict with accuracy which catalysts will foul and which will give stable operation for months without fouling reactor surfaces. Obviously, for economical commercial operation, the catalyst must not foul reactor surfaces. Fouling in a commercial reactor leads to "down time" with consequent loss of production and extra maintenance cost for cleaning. Thus, fouling will cause a gas-phase fluidized-bed process to lose its economic advantage over slurry processes.

The following examples are given to illustrate the invention and are not intended as a limitation thereof. In these examples, compositions and processes that are illustrative of the invention are distinguished from those that are outside the scope of the invention and are included only for comparative purposes by using an alphabetic designation for any example or run that is a comparative example and a numeric designation for the examples and runs that are illustrative of the invention. Yields given in the examples are measures of productivity in terms of the number of grams of polymer produced per gram of catalyst per hour, melt indices ($MI_2$) are those determined by ASTM test D-1238-65T using a 2160-gram weight, while the NVR values are "normalized" melt viscosity ratios determined by (1) measuring the apparent viscosities of the polymers at 30 sec$^{-1}$ and 300 sec.$^{-1}$, respectively, at 200° C. in an Instron capillary rheometer and (2) normalizing them to $V_{30}=5$ by the equation.

$$NVR = \text{antilog} \ (0.14699 + 0.7897 \log V_{30} - \log V_{300})$$

where $V_{30}$ and $V_{300}$ are the measured apparent viscosities. This normalization permits comparison of the viscosity ratios of polymers having different $V_{30}$ values, since the unnormalized $V_{30}/V_{300}$ ratio is a function of $V_{30}$. The NVR is constant for any given catalyst over an $MI_2$ range of about 1-30, and only slight deviations occur outside of that range.

In the examples, the following procedures are used to prepare the catalyst compositions and polymers.

PREPARATION OF CATALYSTS

In the preparation of each of the catalysts, dry Davison 952 silica gel (a commercial inorganic oxide having a surface area of about 250-350 square meters per gram, a pore volume of about 1.5-1.7 cc per gram, and an average particle size of about 65-75 microns) by heating it under dry, deoxygenated nitrogen for about 16 hours at a temperature of about 225°-275° C. to provide an activated oxide containing about 1.4 mmols of available hydroxyl groups per gram. Cool the activated oxide to ambient temperature under a purified nitrogen blanket, suspend it in commercial hexane, add neat trialkylaluminum, and stir the resultant slurry for about 30 minutes. Then add a vanadium compound in neat or solution form, stir the resultant slurry for an additional 30-60 minutes, add an ether-alcohol, stir for another 30-60 minutes, and remove the hexane under a nitrogen purge to produce a powdered solid catalyst. The particular ingredients used to prepare the catalysts and the amounts of trialkylaluminum, vanadium, and ether-alcohol compounds added per gram of inorganic oxide are shown in the examples and/or tables.

SLURRY POLYMERIZATION

Charge 1.5 liters of dry hexane to a suitable autoclave under a dry, deoxygenated nitrogen atmosphere, add about 0.5-1.1 ml of a 30% solution of triethyaluminum in heptane as a activator-scavenger, stir, and add a slurry of 0.1-0.4 gram of catalyst powder in, respectively, 1-4 ml of commerical hexane. Raise the temperature of the reactor to 85°-90° C., pressurize the reactor with enough hydrogen to achieve the production of a polymer having the desired melt index, add about 40-100 cc of liquid butene-1 as a comonomer, raise the reactor pressure to about 2.1 MPa with ethylene, and hold the pressure at that level throughout the polymerization by adding ethylene as needed. Immediately after pressurizing the reactor with monomer, add 5 cc of a 0.25% solution of chloroform in hexane as a promoter; and, at 15-minute intervals thereafter, add supplemental 5 cc aliquots of the promoter solution. After 30-60 minutes, stop the polymerization by venting the autoclave, opening the reactor, filtering the polymer from the liquid medium, and drying the polymer.

LABORATORY GAS-PHASE POLYMERIZATION

The laboratory apparatus consisted of a continuous polymerization reaction system essentially as depicted by Miller in the drawing of U.S. Pat. No. 4,003,712, with two exceptions: there was no filter in the gas recycle line, and the catalyst was fed to the reactor with nitrogen only. The reactor itself was 10 cm in diameter, 120 cm tall. Recycle gas passed through a velocity reduction or disengaging zone atop the reactor, through a cyclone separator, through a centrifugal compressor, and into the bottom of the reactor where the gas was distributed into the fluidized bed by a dispersion or distribution plate. Heat exchange was effected by circulating presurized, tempered water through jacketing on the recycle gas piping. This system had a rated capacity of 450 g of polymer per hour. Generally, for catalyst screening studies, the system was operated as follows:

Introduce a stream or streams of ethylene, any comonomer(s), chloroform, and hydrogen to the reactor. Continuously withdraw unreacted or recycle gas from the top of the disengaging zone, pass it through a heat exchanger to maintain a bed temperature of about 95°-100° C., and introduce it at the bottom of the reactor at a rate sufficient to give a superficial velocity of about 25 cm/sec in the bed.

Introduce make-up monomer, chloroform, and hydrogen into the recycle gas line so as to maintain constant gas composition as detected by on-line analyzers and so as to maintain the reactor pressure at about 3.5 MPa and to provide about 40 mmols of chloroform per mmol of vanadium per hour, and feed fresh catalyst particles into the reactor below the top of the bed so as to provide a vanadium feed rate of one mmol per hour. Add triethylaluminum as a scavenger and cocatalyst during the polymerization so as to provide a triethylaluminum feed rate of 20 mmol per hour. Withdraw polymer product semi-continuously from the bottom of the bed at a rate such as to maintain a constant bed level. Take aliquots of withdrawn polymer for testing.

EXAMPLE I

Prepare two catalyst compositions by the catalyst preparation procedure described above. Then use each of the catalyst compositions to prepare an ethylene/butene-1 copolymer by the slurry polymerization procedure described above. The amounts of ingredients employed in the production of the catalyst compositions, and the yields, melt indices, and normalized viscosity ratios (NVR), i.e., molecular weight distributions, of the polymers are shown in Table I.

TABLE I

| RUN # | CATALYST COMPOSITION | YIELD | MI$_2$ | NVR |
|---|---|---|---|---|
| A | VOCl$_3$/Al(C$_2$H$_5$)$_3$/SiO$_2$<br>0.1 mmol 1.4 mmol 1 g | 600 g | 0.6 | 2.55 |
| 1 | CH$_3$OCH$_2$CH$_2$OH/VOCl$_3$/<br>Al(C$_2$H$_5$)$_3$/SiO$_2$<br>1 mmol 0.1 mmol 1.4 mmol 1 g | 238 g | 5.0 | 1.90 |

As demonstrated above, (A) the molecular weight distribution of ethylene polymers prepared in the presence of catalyst composition of the type taught in British Pat. No. 1,489,410 are such as to make the polymers useful as blow-molding resins, but (B) narrower molecular weight distribution making the polymers utilizable as injection-molding resins can be obtained by the use of the ether-alcohols of the invention as catalyst components. The following two examples show that the catalyst compositions of the prior art and of the present invention affect polymer molecular weight distribution in substantially the same way when used in gas-phase processes for the polymerization of ethylene, with or without alpha-olefin comonomers.

EXAMPLE II

Repeat Example I except for using each of the two catalyst compositions to prepare an ethylene/propylene copolymer by the laboratory gas-phase polymerization procedure described above. Similar results are observed, the use of the ether-alcohol as a catalyst component effecting a narrowing of the molecular weight distribution of the polymer without reactor fouling.

EXAMPLE III

Repeat Example II except for employing no propylene in the laboratory gas-phase polymerization process. Similar results in the ability of the ether-alcohol to narrow polymer molecular weight distribution without reactor fouling are observed.

EXAMPLE IV

Prepare eight catalyst compositions by the catalyst preparation procedure described above, and use each of the compositions to prepare an ethylene-butene-1 copolymer by the slurry polymerization procedure which is also described above. The amounts of ingredients employed in the production of the catalyst compositions, and the melt indices and NVR values of the polymers are shown in Table II.

TABLE II

| RUN # | CATALYST COMPOSITION | MI$_2$ | NVR |
|---|---|---|---|
| B | VCl$_4$/Al(C$_2$H$_5$)$_3$/SiO$_2$<br>0.05 mM 1.4 mM 1 g | 16 | 2.32 |
| C | VCl$_4$/Al(C$_2$H$_5$)$_3$/SiO$_2$<br>0.7 mM 1.4 mM 1 g | 1.4 | 2.23 |
| 2 | CH$_3$OCH$_2$CH$_2$OH/VCl$_4$/Al(C$_2$H$_5$)$_3$/SiO$_2$<br>1.0 mM 0.07 mM 1.4 mM 1 g | 11 | 1.93 |
| 3 | CH$_3$OCH$_2$CH$_2$OH/VCl/Al$_4$(C$_2$H$_5$)$_3$/SiO$_2$<br>1.0 mM 0.1 mM 1.4 mM 1 g | 27 | 1.89 |
| 4 | CH$_3$OCH$_2$CH$_2$OH/VCl$_4$/Al(C$_2$H$_5$)$_3$/SiO$_2$<br>0.5 mM 0.2 mM 1.4 mM 1 g | 15 | 2.01 |
| 5 | CH$_3$OCH$_2$CH$_2$OH/VCl$_4$/Al(C$_2$H$_5$)$_3$/SiO$_2$<br>1.0 mM 0.4 mM 1.4 mM 1 g | 2.3 | 2.10 |
| 6 | CH$_3$CH$_2$OCH$_2$CH$_2$OH/VCl$_4$/<br>Al(C$_2$H$_5$)$_3$/SiO$_2$<br>1.0 mM 0.07 mM 1.4 mM 1 g | 21 | 1.80 |
| 7 | CH$_3$OCH$_2$CH$_2$OCH$_2$CH$_2$OH/VCl$_4$<br>Al(C$_2$H$_5$)$_3$/SiO$_2$<br>1.0 mM 0.07 mM 1.4 mM 1 g | 11 | 1.90 |

EXAMPLE V

Use the catalyst composition of Example IV, Run #3, to prepare an ethylene/butene-1 copolymer by the laboratory gas-phase polymerization procedure described above. The process results in the formation of a copolymer having an NVR value of 1.88 without any evidence of reactor fouling.

As demonstrated in the two preceding examples, the ether-alcohols of the invention are effective in narrowing polymer molecular weight distribution even when the vanadium component of the catalyst composition is one that, even without the modification provided by the present invention, permits the formation of polymers having narrower molecular weight distribution than the blow-molding polymers of British Pat. No. 1,489,410.

EXAMPLE D

An attempt was made to essentially repeat Example III of U.S. Pat. No. 4,232,140 using the laboratory gas-phase polymerization method described above using Ort's catalyst and CFCl$_3$ promoter, operating the equipment continuously 24 hours a day. After two days, and before the reaction had lined out sufficiently to get a good sample of the desired product for comparison with the products made by the catalysts of this invention, the reactor became inoperable. After the reaction system had been shut down, the reactor was opened. The reactor walls and distribution plate were found to be fouled with polymer to the extent that normal fluidization could not be maintained.

The reactor was thoroughly cleaned, and the attempt repeated. This time, the reactor "fouled out" in about one day. A third attempt to run Ort's catalyst and CFCl$_3$ promoter on a continuous basis was similarly unsuccessful.

EXAMPLES VI-VIII

Three samples of narrow molecular weight distribution ethylene copolymers were made in a gas-phase fluidized-bed pilot plant polymerization system over a 10-day period. The reactor was 46 cm in diameter and about 3 m tall. It was topped by a disengaging zone of 92 cm diameter. Gas recycle piping led from the disengaging zone through a heat exchanger and recycle gas blower to the bottom of the reactor. A distribution plate at the bottom of the reactor served to distribute the gas evenly at the bottom of the bed. Gas analyzers monitored the gas composition of the recycle system and, via suitable instrumentation, automatically adjusted flows of feed streams to keep the composition constant. Catalyst was fed directly to the bed with an automatic catalyst feeder using nitrogen as the motive gas to convey the catalyst into the bed. Triethylaluminum (TEA) was pumped directly into the bed. Polymer powder was automatically withdrawn to maintain a constant inventory of powder in the reactor. For all three samples, reaction pressure was about 3.5 MPa, average bed temperature was about 92° C., and the recycle gas rate was about 4525 kg/hr, which gave a gas velocity in the bed of about 30 cm/sec. The catalyst used was the silica-supported catalyst from Example V of U.S. Pat. No. 4,426,317 (Rogers) and had an average composition of 1.4 mM triethylaluminum, 0.07 mM vanadium tetrachloride, and 1.0 mM 2-methoxyethanol per gram of silica. Average reaction conditions during the time each sample was collected and results for each sample are given in Table III. There was no evidence of reactor fouling.

TABLE III

| | EXAMPLE | | |
|---|---|---|---|
| | VI | VII | VIII |
| Recycle Gas Composition: | | | |
| Nitrogen, vol % | 8.4 | 11.8 | 11.7 |
| Ethylene, vol % | 84.0 | 86.2 | 86.4 |
| Propylene, vol % | 1.8 | 1.8 | 1.8 |
| Hydrogen, vol % | 5.8 | 0.2 | 0.1 |
| Chloroform, vol % | .13 | .09 | .07 |
| Reaction Parameters: | | | |
| TEA, cc/hr | 3.4 | 2.6 | 2.8 |
| Al/V ratio | 52 | 44 | 49 |
| CHCl$_3$/V Ratio | 355 | 157 | 36 |
| Production, kg/hr | 7 | 13 | 15 |
| Polymer Results | | | |
| Melt Index, g/10 min | 0.14 | 0.02 | too hard |
| Density, g/cc | 0.951 | 0.949 | 0.932 |
| Total ash, ppm wt. | 2054 | 1195 | 836 |
| V residue, ppm wt. as V | 4.7 | 2.5 | 1.9 |

EXAMPLE E

Although the co-polymer of Example VIII has too high a molecular weight to flow in the normal melt index test, it does give measurable flow when a 20 kg weight is used in the test. However, when the hydrogen feed is completely cut-off at the end of the run of Example VIII, the co-polymer product will not flow in a melt index test even with 20 kg weight on the plunger.

EXAMPLE F

At the end of the run of Example VII, all conditions are held as constant as possible, but the chloroform feed is cut-off. The concentration of chloroform in the recycle gas gradually drops as the recycle gas is purged to analyzers, some escapes as the co-polymer product is removed from the fluidized bed, etc. As the cholorform concentration diminishes, the reaction rate and bed temperature decrease and the ash and vanadium residue levels in the polymer increase. After 24 hours the production rate is less than 1 kg/hr. When chloroform is re-introduced, the production rate and bed temperature increase immediately. Within 24 hours, the conditions of Example VII are re-established. Then the TEA, co-catalyst, is cut-off, all other conditions being held as constant as possible. For the first two hours, no change is seen, but then the production or reaction rate begins to decrease rapidly and the residue and ash level in the polymer product increase correspondingly. Within 24 hours, the production or reaction rate is less than 1 kg/hr. When the TEA co-catalyst feed is restarted, the production/or reaction rate and bed temperature begin to increase within a few minutes. Within a few hours, the production rate of 13 kg/hr. is re-established.

EXAMPLE IX

A commercial gas-phase fluidized-bed polymerization is carried out in a polymerization system of the same general description as the pilot plant of examples VI–VIII. However, the reactor is 3.6 m in diameter and about 15 m tall. Recycle gas rate is sufficient to give a gas velocity in the bed of about 30 cm/sec. The polymerization is conducted at 3.5 MPa pressure and 93 degrees C average bed temperature with a feed stream targets of 7.6 mol % nitrogen, 85.0% ethylene, 1.9% propylene, 5.5% hydrogen, and 0.11% chloroform. The catalyst has the same formulation as in Examples VI–VIII, but is made in commercial batches of 450 kg each. The Al/V ratio during polymerization varies slightly as monomer purity varies, but is in the range of 4 to 10.

The polymer, produced at a rate of about 8.5 metric tons per hour, is an injection molding grade, has an average melt index of 21, an average density of 0.959, and an NVR of 2.0 plus or minus 0.1. After six (6) months of commercial operation, there is substantially no reactor fouling.

Similar results in the narrowing of the molecular weight distribution of ethylene polymers are obtained when the examples are repeated except that the catalyst components, component proportions, comonomers, comonomer proportions, and/or polymerization conditions specified in the examples are replaced with other catalyst components, component proportions, comonomers, comonomer proportions, and/or polymerization conditions taught to be their equivalent in the specification.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

We claim:

1. A process of polymerizing a monomer charge comprising chloroform, ethylene, and hydrogen comprising the steps of:
   (a) drying an inorganic oxide selected from the group consisting of silica, alumina, magnesia, and mixture thereof, having surface hydroxyl groups to form a support that is substantially free of adsorbed water;
   (b) reacting the surface hydroxyl groups of the support with a substantially stoichiometric amount of at least one organometallic compound corresponding to the formula $R_xALR^i_yR^{ii}_z$, wherein R is an alkyl group containing 1 to 12 carbon atoms, $R^i$ and $R^{ii}$ are independently selected from the group consisting of H, and alkyl and alkoxy groups containing 1 to 12 carbon atoms, x has a value of 1 to 3, and y and z each can have a value of 0 to 2 and the sum of y and z is not greater than 3-x, to provide a treated support;
   (c) reacting the thus-treated support with from between about 0.001 mol to about 3 mols, per mol of organometallic compound, of at least one vanadium compound corresponding to a formula selected from at least one of the formulas $(R^{iii}O)_n\text{-}VOX_{3-n}$ and $(R^{iii}O)_m VX_{4-m}$, in which formulas $R^{iii}$ is a monovalent hydrocarbon radical that is free of aliphatic unsaturation having from 1 to 18 carbon atoms, X is Cl or Br, n has a value of 0 to 3, and m has a value of 0 to 4;

(d) reacting the product of step (c) with from about 0.1 mol to about 10 mols, per mol of organometallic compound, of an ether-alcohol corresponding to the formula $R^{vi}[OCHR^v(CH_2)_r CHR^{iv}]_p OH$, wherein $R^{iv}$ and $R^v$ are independently selected from the group consisting of hydrogen and alkyl groups containing from 1 to 18 carbon atoms, Rvi is a hydrocarbyl group, r has a value of 0 to 16, and p has a value of at least 1;

(e) contacting in a gas-phase reaction zone containing a trialkylaluminum activator the catalyst product of step (d) with a monomer charge comprising chloroform, ethylene, and hydrogen to produce a high yield polymerized monomer having a narrow-to-intermediate molecular weight distribution.

2. The process of claim 1 additionally comprising removing particulate substantially polymerized monomer particles from the reaction zone having a narrow-to-intermediate molecular weight distribution.

3. The process of claim 1 wherein said contacting in a gas-phase reaction zone is without having washed the catalyst product.

4. The process of claim 3 additionally comprising recyclying unreacted monomer charge from the top of the reaction zone to the bottom of the reaction zone.

5. A processing of polymerizing a monomer charge comprising chloroform, ethylene, and hydrogen comprising the steps of:

(a) drying an inorganic oxide selected from the group consisting of silica, alumina, magnesia, and mixture thereof, having surface hydroxyl groups to form a support that is substantially free of adsorbed water;

(b) reacting the surface hydroxyl groups of the support with a substantially stoichiometric amount of at least one organometallic compound corresponding to the formula $R_x AlR^i_y R^{ii}_z$, wherein R is an alkyl group containing 1 to 12 carbon atoms, $R^i$ and $R^{ii}$ are independently selected from the group consisting of H, and alkyl and alkoxy groups containing 1 to 12 carbon atoms, x has a value of 1 to 3, and y and z each can have a value of 0 to 2 and the sum of y and z is not greater than $3-x$, to provide a treated support;

(c) reacting the thus-treated support with from between about 0.001 mol to about 3 mols, per mol of organometallic compound, of at least one vanadium compound corresponding to a formula selected from at least one of the formulas $(R^{iii}O)_n\text{-}VOX_{3-n}$ and $(R^{iii}O)_m VX_{4-m}$, in which formulas $R^{iii}$ is a monovalent hydrocarbon radical that is free of aliphatic unsaturation having from 1 to 18 carbon atoms, X is Cl or Br, n has a value of 0 to 3, and m has a value of 0 to 4;

(d) reacting the product of step (c ) with from about 0.1 mol to about 10 mols, per mol of organometallic compound, of an ether-alcohol corresponding to the formula $R^{vi}[OCHR^v(CH_2)_r CHR^{iv}]_p OH$, wherein $R^{iv}$ and $R^{iv}$ are independently selected from the group consisting of hydrogen and alkyl groups containing from 1 to 18 carbon atoms, $R^{vi}$ is a hydrocarbyl group, r has a value of 0 to 16, and p has a value of at least 1;

(e) contacting in a gas-phase reaction zone containing a trialkylaluminum activator, without washing the catalyst product of step (d), the catalyst product with a monomer charge comprising chloroform, ethylene, and hydrogen to produce a high yield polymerized monomer having a narrow-to-intermediate molecular weight distribution.

6. The process of claim 5 additionally comprising removing particulate substantially polymerized monomer particles from the reaction zone having a narrow-to-intermediate molecular weight distribution.

7. The process of claim 6 additionally comprising recyclying unreacted monomer charge from the top of the reaction zone to the bottom of the reaction zone.

8. The process of claims 1 or 5 wherein the inorganic oxide is silica.

9. The process of claim 1 or 5 wherein the organometallic compound is a trialkylaluminum.

10. The process of claim 9 wherein the trialkylaluminum is triethylaluminum.

11. The process of claim 9 wherein the trialkylaluminum is tri-n-hexylaluminum.

12. The process of claim 1 or 5 wherein the vanadium compound is a compound corresponding to the formula $(R^{iii}O)_n VOCl_{3-n}$.

13. The process of claim 12 wherein $R^{iii}$ is alkyl and n has a value of 1.

14. The process of claim 12 wherein n has a value of 0.

15. The process of claims 1 or 5 wherein the vanadium compound is a compound corresponding to the formula $(R^{iii}O)_m VCl_{4-m}$.

16. The process of claim 15 wherein m has a value of 0.

17. The process of claim 1 or 5 wherein the ether-alcohol is a compound in which the hydrocarbyl group is an alkyl group.

18. The process of claim 17 wherein the alkyl group contains 1 to 18 carbon atoms.

19. The process of claim 18 wherein the ether-alcohol is a compound corresponding to the formula $CH_3(CH_2)_r[OCH_2CH_2]_p OH$, wherein r has a value of 0 to 1 and p has a value of 1 or 2.

20. The process of claim 19 wherein r has a value of 0.

21. The process of claim 1 or 5 wherein the amounts of materials employed are such as to provide, as starting materials, about 5 to 30 mols of organometallic compound per mol of vanadium compound.

22. A process of polymerizing a monomer charge comprising chloroform, ethylene, and hydrogen comprising the steps of:

(a) drying at between 100° to 1000° C. a silica support having surface hydroxyl groups to form a support that is substantially free of adsorbed water;

(b) reacting the surface hydroxyl groups of the support with a substantially stoichiometric amount of triethylaluminum per gram of silica support, to provide a treated support;

(c) reacting the thus-treated support with from about 0.001 mol to about 3 mols, per mol of triethylaluminum compound, of $VCl_4$;

(d) reacting the product of step (c) with from about 0.1 mol to about 10 mols, per mol of organometallic compound, of an ether-alcohol corresponding to the formula $CH_3(CH_2)n[OCH_2CH_2]_m OH$ wherein n has a value of 0 or 1 and m has a value of 1 or 2; and (e) contacting in a gas-phase reaction zone containing a trialkylaluminum activator, without washing the catalyst product of step (d), the catalyst product with a monomer charge comprising chloroform, ethylene, and hydrogen to produce a high yield polymerized monomer having a narrow-to-intermediate molecular weight distribution without fouling the gas-phase reaction zone.

23. The process of claim 1, 5 or 22 wherein said monomer charge additionally comprises at least one alpha-olefin containing 3 to 8 carbon atoms.

24. The process of claim 22 additionally comprising removing particulate substantially polymerized monomer particles from the reaction zone having a narrow-to-intermediate molecular weight distribution.

25. The process of claim 24 additionally comprising recyclying unreacted monomer charge from the top of the reaction zone to the bottom of the reaction zone.

26. A process of polymerizing a monomer charge comprising chloroform, ethylene, and hydrogen in a gas-phase, fluidized-bed, reaction zone which comprises a bed of particulate substantially polymerized ethylene particles and is under operating conditions for polymerizing ethylene using the monomer charge, said process comprising the steps of:

(a) drying at from about 100° to about 1000° C. an inorganic oxide selected from the group consisting of silica, alumina, magnesia, and mixture thereof, having surface hydroxyl groups to form a support that is substantially free of adsorbed water;

(b) cooling the dried inorganic oxide of step (a) to ambient temperature;

(c) reacting the surface hydroxyl groups of the support with a substantially stoichiometric amount of at least one organometallic compound corresponding to the formula $R_xAlR^i_yR^{ii}_z$, wherein R is an alkyl group containing 1 to 12 carbon atoms, $R^i$ and $R^{ii}$ are independently selected from the group consisting of H, and alkyl and alkoxy groups containing 1 to 12 carbon atoms, x has a value of 1 to 3, and y and z each can have a value of 0 to 2 and the sum of y and z is not greater than 3—x, to provide a treated support;

(d) reacting the thus-treated support with from between about 0.001 mol to about 3 mols, per mol of organometallic compound, of at least one vanadium compound corresponding to a formula selected from at least one of the formulas $(R^{iii}O)_nVOX_{3-n}$ and $(R^{iii}O)_mVX_{4-m}$, in which formulas $R^{iii}$ is a monovalent hydrocarbon radical that is free of aliphatic unsaturation having from 1 to 18 carbon atoms, X is Cl or Br, n has a value of 0 to 3, and m has a value of 0 to 4;

(e) reacting the product of step (d) with from about 0.1 mol to about 10 mols, per mol of organometallic compound, of an ether-alcohol corresponding to the formula $R^{vi}[OCHR^v(CH_2)_rCHR^{iv}]_pOH$, wherein $R^{iv}$ and $R^v$ are independently selected from the group consisting of hydrogen and alkyl groups containing from 1 to 18 carbon atoms, $R^{vi}$ is a hydrocarbyl group, r has a value of 0 to 16, and p has a value of at least 1;

(f) drying the product of step (e);

(g) feeding the product of step (f) into a gas-phase reaction zone in order to form part of the bed in the fluidized-bed reaction zone;

(h) feeding, separately and independently of said feeding step (g), into the gas-phase reaction zone triethylaluminum such that such bed in the gas-phase reaction zone comprises the product of step (g), triethylaluminum, and particulate substantially polymerized ethylene particles;

(i) fluidizing the bed of step (h) at a temperature from about 50° C. to about 120° C. by introducing into the reaction zone a gas mixture comprising ethylene, hydrogen and chloroform;

(j) removing particulate substantially polymerized ethylene particles from the reaction zone having a narrow-to-intermediate molecular weight distribution; and (k) recycling unreacted gas mixture of step (i) from the top of the reaction zone, through a heat exchanger means, and into the bottom of the reaction zone.

27. A process of polymerizing a monomer charge comprising an alpha olefin, chloroform, ethylene, and hydrogen in a gas-phase, fluidized-bed, reaction zone which comprises a bed of particulate substantially polymerized ethylene particles and is under operating conditions for polymerizing ethylene using the monomer charge, said process comprising the steps of:

(a) drying at from about 100° to about 1000° C. an inorganic oxide selected from the group consisting of silica, alumina, magnesia, and mixture thereof, having surface hydroxyl groups to form a support that is substantially free of adsorbed water;

(b) cooling the dried inorganic oxide of step (a) to ambient temperature;

(c) reacting the surface hydroxyl groups of the support with a substantially stoichiometric amount of at least one organometallic compound corresponding to the formula $R_xAlR^i_yR^{ii}_z$, wherein R is an alkyl group containing 1 to 12 carbon atoms, $R^i$ and $R^{ii}$ are independently selected from the group consisting of H, and alkyl and alkoxy groups containing 1 to 12 carbon atoms, x has a value of 1 to 3, and y and z each can have a value of 0 to 2 and the sum of y and z is not greater than 3—x, to provide a treated support;

(d) reacting the thus-treated support with from about 0.001 mol to about 3 mols, per mol of organometallic compound, of at least one vanadium compound corresponding to a formula selected from at least one of the formulas $(R_{iii}O)_nVOX_{3-n}$ and $(R^{iii}O)_mVX_{4-m}$, in which formulas $R_{iii}$ is a monovalent hydrocarbon radical that is free of aliphatic unsaturation having from 1 to 18 carbon atoms, X is Cl or Br, n has a value of 0 to 3, and m has a value of 0 to 4;

(e) reacting the product of step (d) with from about 0.1 mol to about 10 mols, per mol of organometallic compound, of an ether-alcohol corresponding to the formula $R^{vi}[OCHR^v(CH_2)_rCHR^{iv}]_pOH$, wherein $R^{iv}$ and $R^v$ are independently selected from the group consisting of hydrogen and alkyl groups containing from 1 to 18 carbon atoms, $R^{vi}$ is a hydrocarbyl group, r has a value of 0 to 16, and p has a value of at least 1;

(f) drying the product of step (e);

(g) feeding the product of step (f) into a gas-phase reaction zone in order to form part of the bed in the fluidized-bed reaction zone;

(h) feeding, separately and independently of said feeding step (g), into the gas-phase reaction zone triethylaluminum such that such bed in the gas-phase reaction zone comprises the product of step (g) triethylaluminum, and particulate substantially polymerized ethylene particles;
(i) fluidizing the bed of step (h) at a temperature from about 50° C. to about 120° C. by introducing into the reaction zone a gas mixture comprising ethylene, hydrogen, an alpha olefin, and chloroform;
(j) removing particulate substantially polymerized ethylene particles from the reaction zone having a narrow-to-intermediate molecular weight distribution; and
(k) recycling unreacted gas mixture of step (i) from the top of the reaction zone, through a heat exchanger means, and into the bottom of the reaction zone.

* * * * *